(12) United States Patent
Ko (10) Patent No.: US 10,620,820 B2
(45) Date of Patent: Apr. 14, 2020

(54) ELECTRONIC DEVICES HAVING TOUCH-SENSING MODULE AND METHOD FOR GENERATING DISPLAYED IMAGE

(71) Applicant: Acer Incorporated, New Taipei (TW)

(72) Inventor: Chueh-Pin Ko, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 78 days.

(21) Appl. No.: 15/913,755

(22) Filed: Mar. 6, 2018

(65) Prior Publication Data

US 2019/0012057 A1   Jan. 10, 2019

(30) Foreign Application Priority Data

Jul. 10, 2017   (TW) .............................. 106123018 A (51) Int. Cl.
  *G06F 3/0488*  (2013.01)
  *G06F 9/451*   (2018.01)
  *G06F 3/041*   (2006.01)
  *G06F 1/3234*  (2019.01)

(52) U.S. Cl.
  CPC .......... *G06F 3/0488* (2013.01); *G06F 1/3262* (2013.01); *G06F 3/0412* (2013.01); *G06F 9/451* (2018.02)

(58) Field of Classification Search
  CPC ................................................... G06F 3/0488
  USPC ....................................................... 345/173
  See application file for complete search history.

(56) References Cited

U.S. PATENT DOCUMENTS

| 2015/0235391 A1* | 8/2015 | Makino ................. G06T 11/203 345/629 |
| 2016/0048318 A1* | 2/2016 | Markiewicz ........ G06F 3/04883 345/173 |
| 2018/0267633 A1* | 9/2018 | Keidar .................... G06F 3/038 |

FOREIGN PATENT DOCUMENTS

| CN | 101661326 A | 3/2010 |
| CN | 106168866 A | 11/2016 |

OTHER PUBLICATIONS

Chinese language office action dated Dec. 27, 2017, issued in application No. TW 106123018.

* cited by examiner

*Primary Examiner* — Long D Pham
(74) *Attorney, Agent, or Firm* — McClure, Qualey & Rodack, LLP (57) ABSTRACT

An electronic device includes a touch-sensing module, an image-display control module, and a display. The touch-sensing module senses a touch event corresponding to at least one touch object, and outputs a position signal based on the touch event. The image-display control module connects to the touch-sensing module through a channel, receives the position signal via the channel from the touch-sensing module, and refreshes at least a portion of a current displayed image according to the position signal. The display displays a refreshed displayed image.

14 Claims, 6 Drawing Sheets

ELECTRONIC DEVICES HAVING TOUCH-SENSING MODULE AND METHOD FOR GENERATING DISPLAYED IMAGE

CROSS REFERENCE TO RELATED APPLICATIONS

This Application claims priority of Taiwan Patent Application No. 106123018, filed on Jul. 10, 2017, the entirety of which is incorporated by reference herein.

BACKGROUND OF THE INVENTION

Field of the Invention

The present invention relates to an electronic device and a method for generating displayed image, and more particularly, to an electronic device and a method for generating displayed images having a turbo drawing mode.

Description of the Related Art

With the rapid development of technology, electronic devices with a plurality of functions are used widely in daily life. The touch panel of electronic devices, such as smartphones, tablets, notebook computers, etc., has developed from a plug-in architecture into an embedded architecture. In order to simplify the circuit design, a touch display integrated IC with a Touch and Display Driver Integration (hereinafter referred to as TDDI) function has been developed in recent years.

Figure 1:
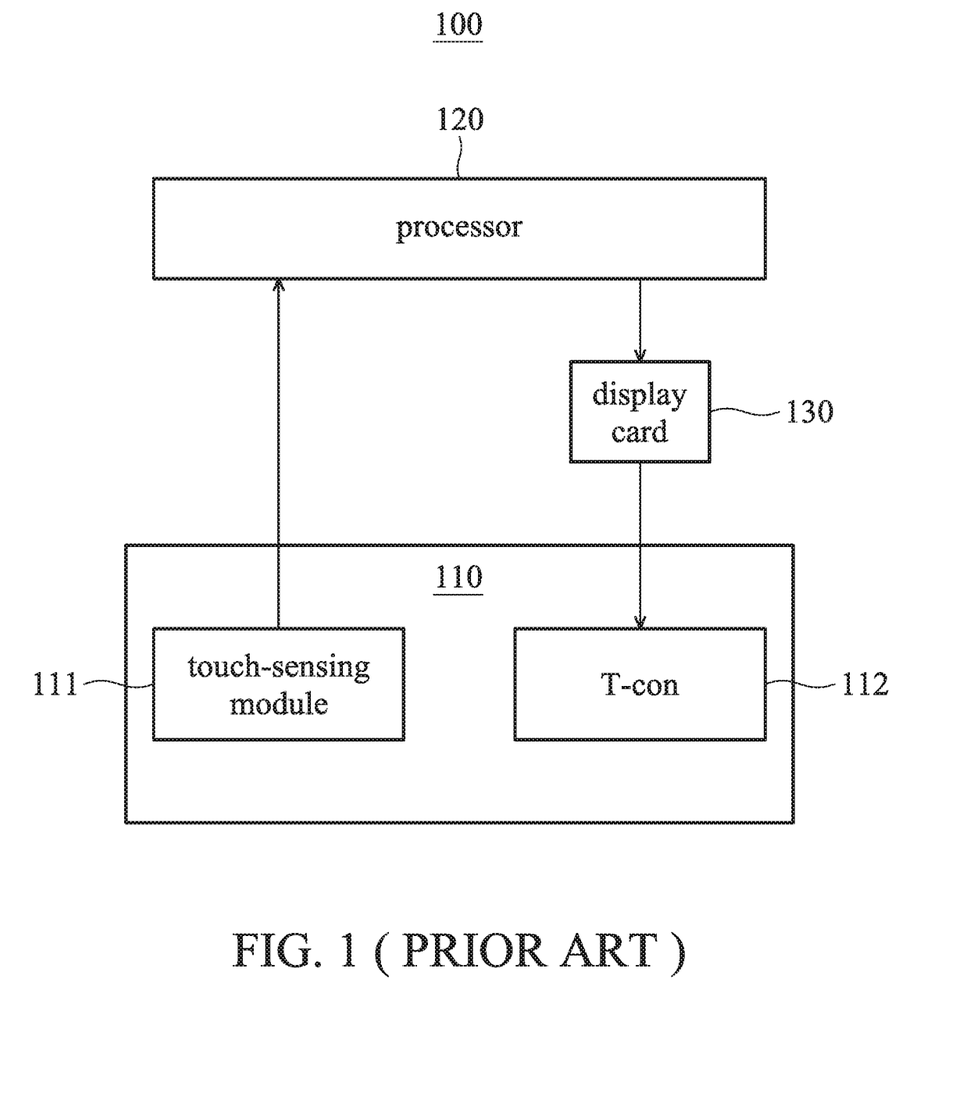
FIG. 1 is a block diagram of an electronic device with a touch-display integrated circuit in a conventional technique.

FIG. 1 is a common electronic device having a touch-display integrated IC. When the user interacts with the touch screen, the touch IC 110 senses a touch event corresponding to at least one touch of the object through sensing electrodes (not shown), and outputs a generated touch signal to the processor 120 to perform the corresponding action in the application. The operation is output from the processor to the display card 130, and the display card 130 outputs an LVDS image signal to a timing controller (hereinafter referred to as T-con) 140. The T-con 140 then converts the LVDS image signal into an LVDS signal that drives a display. As described above, since it is necessary to perform different signal format conversions to convert the generated touch signal for displaying the operations on the display, this may cause a delay in the touch response. In addition, since the LVDS image signal output from the display card 130 corresponds to a complete image, the entire display must be refreshed according to the LVDS image signal whenever the T-con 140 receives the LVDS image signal, and this will result in unnecessary power consumption and a poor user experience.

Therefore, how to speed up the reaction corresponding to the touch events is the problem that needs to be solved immediately.

BRIEF SUMMARY OF INVENTION

An embodiment of the present invention provides an electronic device, including a touch-sensing module, an image-display control module and a display. The touch-sensing module senses a touch event corresponding to at least one touch object, and outputs a position signal based on the touch event. The image-display control module, connected to the touch-sensing module through a channel, receives the position signal via the channel from the touch-sensing module, and refreshes at least a portion of a current displayed image according to the position signal. The display displays a refreshed displayed image.

Another embodiment of the present invention provides a method for generating displayed image, adapted to an electronic device, including: sensing, using a touch-sensing module, a touch event corresponding to at least one touch object; outputting, using the touch-sensing module, a position signal based on the touch event; receiving, using an image-display control module, the position signal via a channel from the touch-sensing module; updating, using the image-display control module, at least a portion of a current displayed image according to the position signal; and displaying, using a display, a refreshed displayed image.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas to which the present fault detection devices and fault detection methods can be applied will become apparent from the detailed description provided herein. It should be understood that the detailed description and specific examples, while indicating exemplary embodiments of electronic devices and methods for generating displayed image, are intended for the purposes of illustration only and are not intended to limit the scope of the invention.

Figure 2:
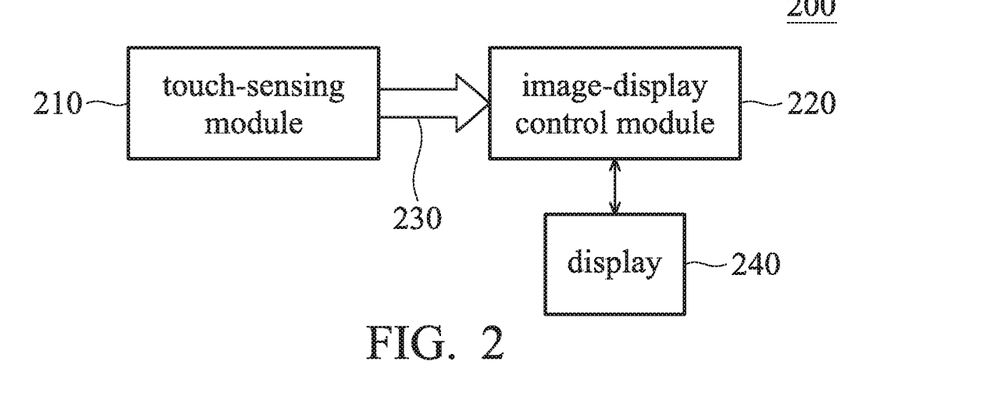
FIG. 2 is a block diagram of an electronic device in accordance with an embodiment of the present invention.

FIG. 2 is a block diagram of an electronic device 200 in accordance with an embodiment of the present invention. The electronic device 200 can be a touch-sensing display or an electronic blackboard, including a touch-sensing module 210, an image-display control module 220, a channel 230 and a display. The touch-sensing module 210 detects a touch event corresponding to at least one touch object and outputs a position signal corresponding to the touch event. The touch object can be a finger of a user, a touch pen or an object having a conductive element, and the position signal can include a position of a touching point of the touch object and/or position changes of the touch event. The image-display control module 220 is connected to the touch-sensing module 210 via the channel 230 for directly receiving the position signal from the touch-sensing module 210 through the channel 230. The image-display control module 220 enables the display 240 to display a displayed image through a user interface, and after receiving the position signal, the image-display control module 220 further refreshes the entire currently displayed image or at least a portion of the currently displayed image according to the position signal.

Figure 3:
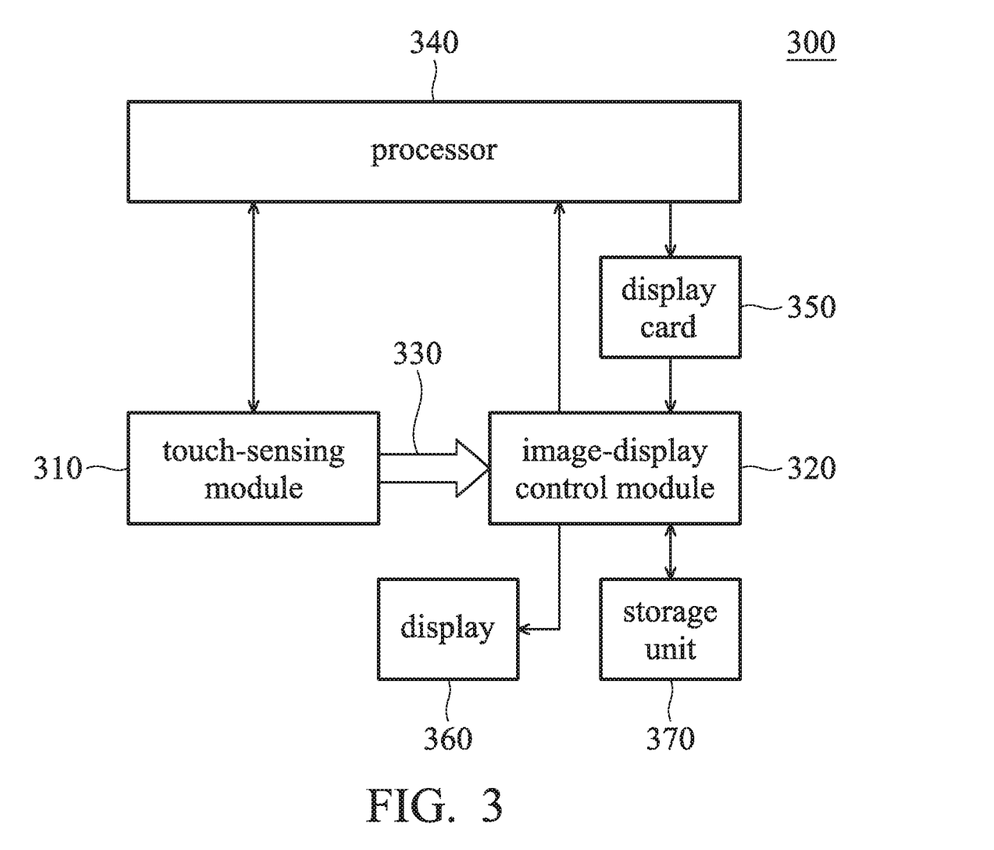
FIG. 3 is a block diagram of the electronic device in accordance with another embodiment of the present invention.

FIG. 3 is a block diagram of the electronic device in accordance with another embodiment of the present invention. As shown in the figure, the electronic device 200 can be any electronic device having a touch-sensing device, and includes a touch-sensing module 310, an image-display control module 320, a channel 330, a processor 340, a display card 350, a display 360 and a storage unit 370. The configuration of touch-sensing module 310, channel 330, and display 360 and the operation to be performed are the same as those of touch-sensing module 210, channel 230 and display 240 described in FIG. 2, and they are not described here to simplify the description. The image-display control module 320 performs different operations for a normal mode and a turbo drawing mode. For example, pixels of the display 360 are refreshed according to the position signal received by the touch-sensing module 310, and/or an image signal output from the display card 350 can be converted into a driving signal for driving the display 360, and the like. The functions performed by the image-display control module 320 can be implemented by a related hardware architecture or program code, or may be implemented by adding the related circuit architecture to a conventional timing controller. The processor 340 executes an application, generates a user interface corresponding to the application, and operates according to various instructions and signals. The display card 350 generates an image signal according to the instructions of the processor 340. The display 360 displays the displayed image according to the drive signal. It should be noted that the touch-sensing module 310 and the image-display control module 320 can be designed on the same wafer or on different wafers according to the needs of the user.

Figure 4:
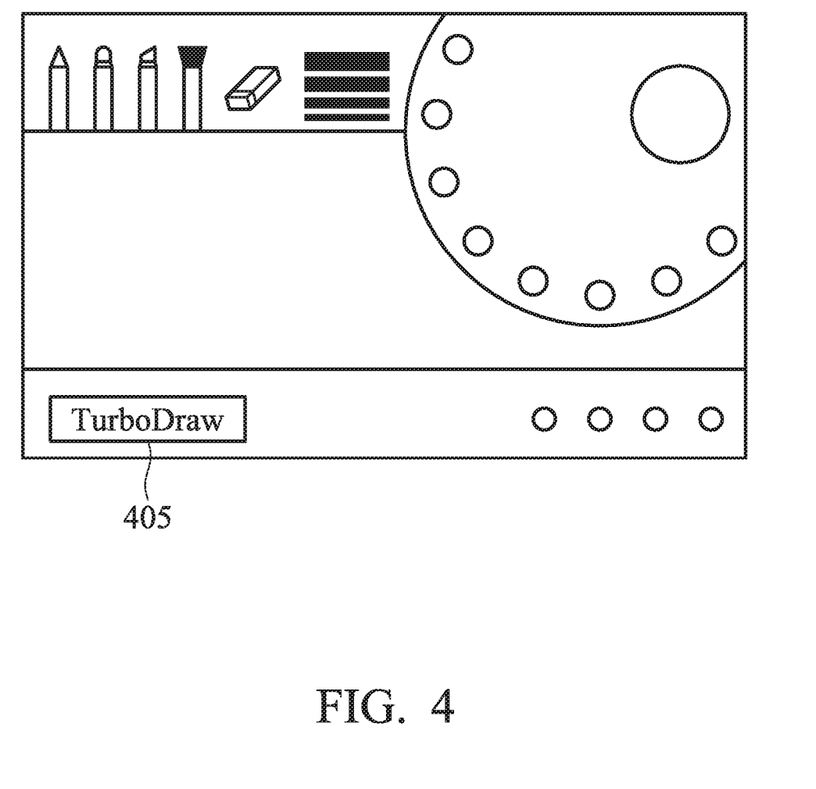
FIG. 4 is a schematic diagram of a user interface of a drawing application operating in a normal mode in accordance with an embodiment of the present invention.

According to an embodiment of the present invention, when the electronic device 300 operates in the normal mode, after the touch-sensing module 310 detects a touch event (e.g., a click or drag action, etc.) corresponding to the touched object, the touch-sensing module 310 outputs the touch signal corresponding to the touch event to the processor 340. The processor 340 outputs a user interface corresponding to the general display mode according to the performed application, and generates a corresponding image signal through the display card 350. The image-display control module 320 receives the image signal from the display card 350, and converts the image signal into an LVDS signal, a MIPI signal or a panel signal (e.g., an eDP signal) having a high resolution for driving the display 360 to display the displayed image. For example, FIG. 4 is a schematic diagram of the user interface corresponding to the general display mode of a drawing application when the electronic device 300 is operated in the normal mode in accordance with an embodiment of the present invention. As shown in the figure, when the user operates on the user interface, the processor 340 outputs the operation result according to the touch signal, such as enabling different functions according to the position of the touch signal, or displaying a pattern corresponding to a drag action of the touch signal. In the general display mode corresponding to the normal mode, the drawing application can provide a complete drawing function and/or an exquisite background to provide the user with the best visual experience and operation function.

According to another embodiment of the present invention, when the power state of the system changes (e.g., enters a power saving mode) or the demand for touch screen sensitivity increases, the user can change the signal transmission path of the touch-sensing module 310 through a trigger event to enter the turbo drawing mode. For example, the user can trigger the trigger event by pulling out a stylus, pressing an icon (e.g., icon 405 shown in FIG. 4) on the user interface in the normal mode, or pressing an entity key. When the trigger event occurs, the processor 340 outputs a switching signal to the touch-sensing module 310 and the image-display control module 320 to inform the touch-sensing module 310 and the image-display control module 320 enter to the turbo drawing mode. In the turbo drawing mode, the touch-sensing module 310 stops outputting the touch signal to the processor 340, generates the position signal corresponding to the touch point of the touch event or the drag action (e.g., information about the positions and/or the position changes), and outputs the position signal to the image-display control module 320 through the channel 330. After receiving the position signal, the image-display control module 320 generates a display-image refresh signal based on the received position signal. The display-image refresh signal may be a normal image signal or a pixel refresh signal, a line refresh signal, or a frame refresh signal, etc., which only refreshes the pixels corresponding to position information and/or the pixels adjacent to the position information. Such that the image-display control module 320 can selectively refresh the entire displayed image or only refresh a portion of the current displayed image according to the signal as described above. When the image-display control module 320 selectively only refreshes a portion of the displayed image, the reaction speed corresponding to the touch event of the electronic device 300 can be increased, and the power consumption of the electronic device can be further reduced.

Figure 5:
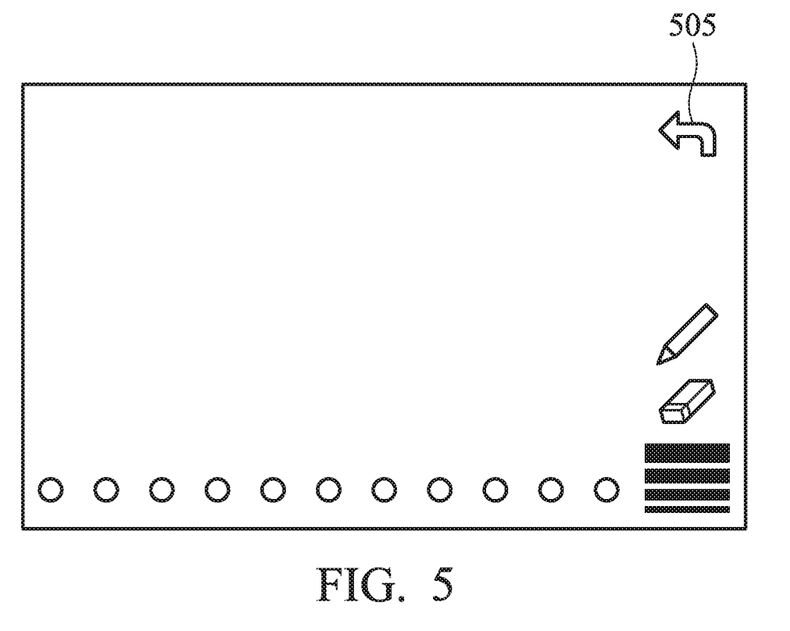
FIG. 5 is a schematic diagram of a user interface of the drawing application operating in a turbo drawing mode according to an embodiment of the present invention.

In addition, when entering the turbo drawing mode, the user interface corresponding to the application in operation can be a simple display mode, and can be provided by the image-display control module 320 to speed up the reaction of the electronic device 300. Comparing with the user interface of the normal display mode, the user interface of the simple display mode has fewer operating functions and/or a simple background. For example, FIG. 5 is a schematic diagram of the user interface corresponding to the simple display mode when the electronic device 300 operates in the turbo drawing mode in accordance with an embodiment of the present invention. As shown in the figure, the user interface shown in FIG. 5 has fewer functions and a simpler background than the functions and the background shown in FIG. 4. In addition, in order to reduce the computation of the image-display control module 320, the user interface of the turbo drawing mode can be presented only in gray-scale or black-and-white, thereby the power consumption of the display or the system can be reduced. The user interface for the turbo drawing mode can be stored in a storage unit 370 (e.g., a memory) connected to the image-display control module 320. Such that when the electronic device 300 enters the turbo drawing mode, the image-display control module 320 can directly download and apply the user interface from the storage unit 370.

Figure 6:
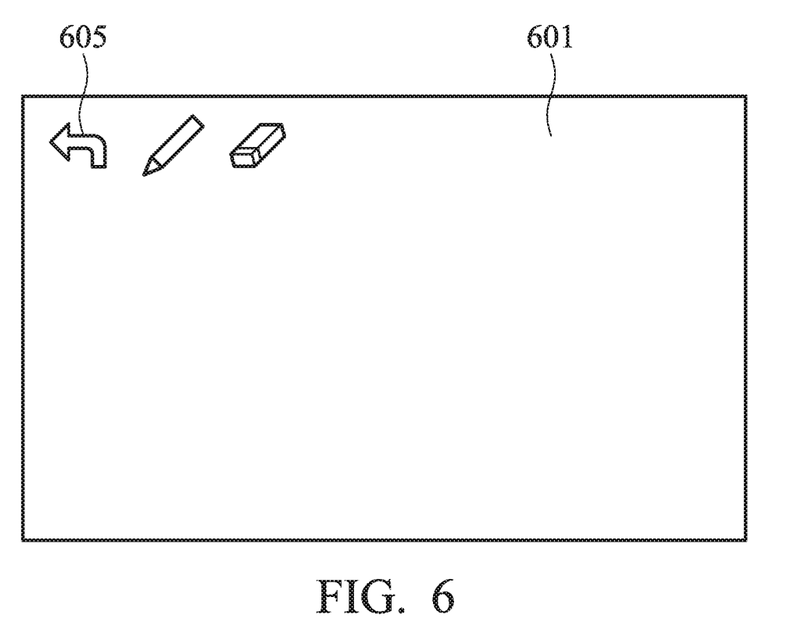
FIG. 6 is a schematic diagram showing another user interface of a drawing application operating in a turbo drawing mode in accordance with another embodiment of the present invention.

FIG. 6 is a schematic diagram of another user interface of the drawing application operating in the turbo drawing mode in accordance with another embodiment of the present invention. In this embodiment, in order to minimize the power consumption of the system, the background 601 of the user interface is presented in all black and the user interface only supports the most basic functions (such as only the function of a brush and an eraser) and a return icon 605 for returning to the normal mode.

As described above, the icons shown in FIGS. 4-6 may correspond to different functions, such as color adjustment, thickness adjustment of stroke, image enhancement, image scaling, image distortion, image offset and storing, etc., but it is not limited thereto. When the image-display control module 320 determines that the touch object touches on the icon based on the touch event, the function corresponding to the icon is enabled.

In addition, according to another embodiment of the present invention, when the image-display control module 320 enters the turbo drawing mode, it is possible to store the last image corresponding to the touch event or each step of actions corresponding to the touch event in the storage unit 370. Furthermore, when the touch-sensing module 310 and the image-display control module 320 switches to the normal mode, the image or action stored in the storage unit 370 is selectively sent back to the processor 340 for further processing.

According to another embodiment of the present invention, the user may switch the touch-sensing module 310 and the image-display control module 320 back to the normal mode by another trigger event. For example, the user may press another entity key, click on an icon corresponding to a switching function (e.g., the icons 505, 605 shown in FIGS. 5 and 6) or perform a specific gesture on the touch screen for triggering the trigger event. When the image-display control module 320 detects the trigger event based on the touch signal, the image-display control module 320 outputs a wake-up signal to the processor 340 to switch to the normal mode from the turbo drawing mode. In the normal mode, the touch-sensing module 211 outputs the touch signal to the processor 340 when detecting the touch event (e.g., clicking or the drag action, etc.) corresponding to the touch object. In addition, after switching back to the normal mode, the displayed user interface may also switch back to the user interface with more functions provided by the processor 340 (such as the user interface shown in FIG. 4).

Figure 7:
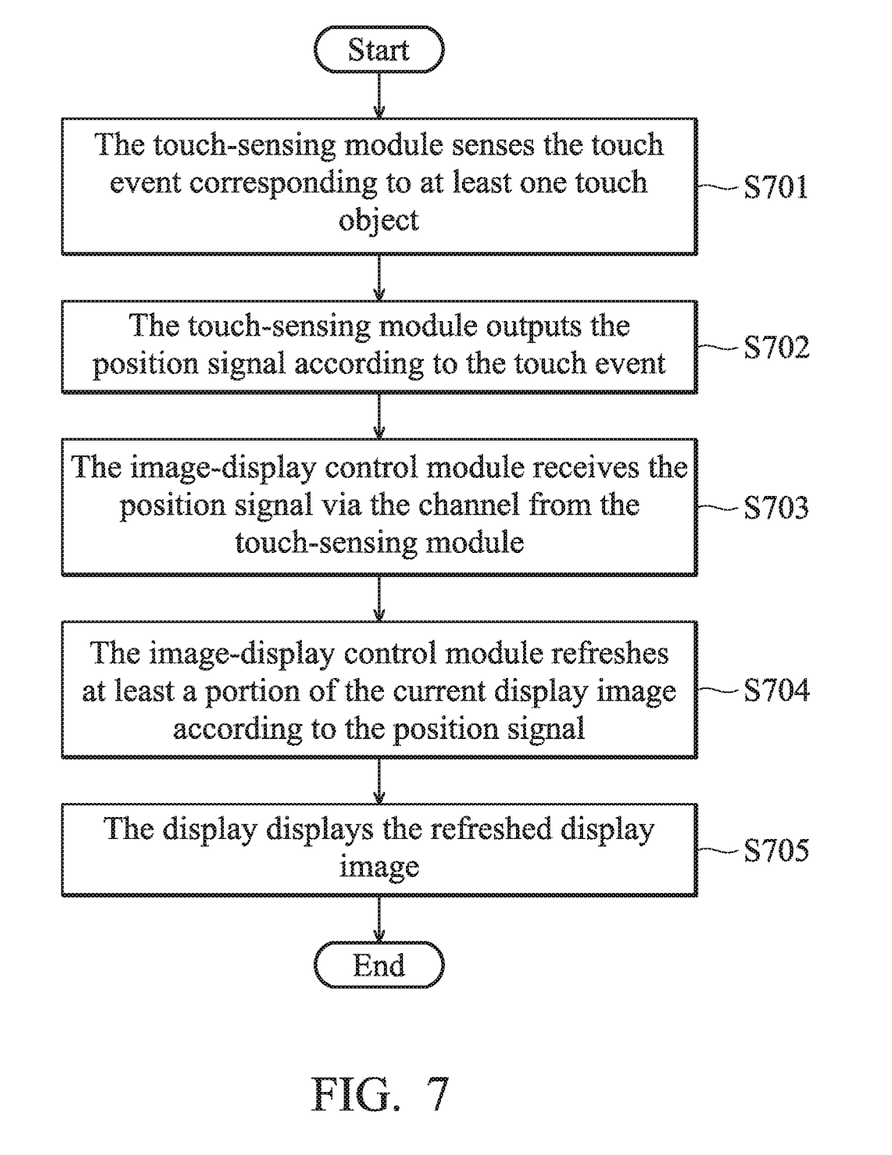
FIG. 7 is a flowchart of a method for generating displayed image in accordance with an embodiment of the present invention.

FIG. 7 is a flowchart of the method for generating a displayed image in accordance with an embodiment of the present invention. In step S701, the touch-sensing module 210 senses the touch event corresponding to at least one touch object. In step S702, the touch-sensing module 210 outputs the position signal according to the touch event. In step S703, the image-display control module 220 receives the position signal via the channel 230 from the touch-sensing module 210. In step S704, the image-display control module 220 refreshes at least a part of the current displayed image according to the position signal. In step S705, the display 240 displays the refreshed displayed image.

Figure 8:
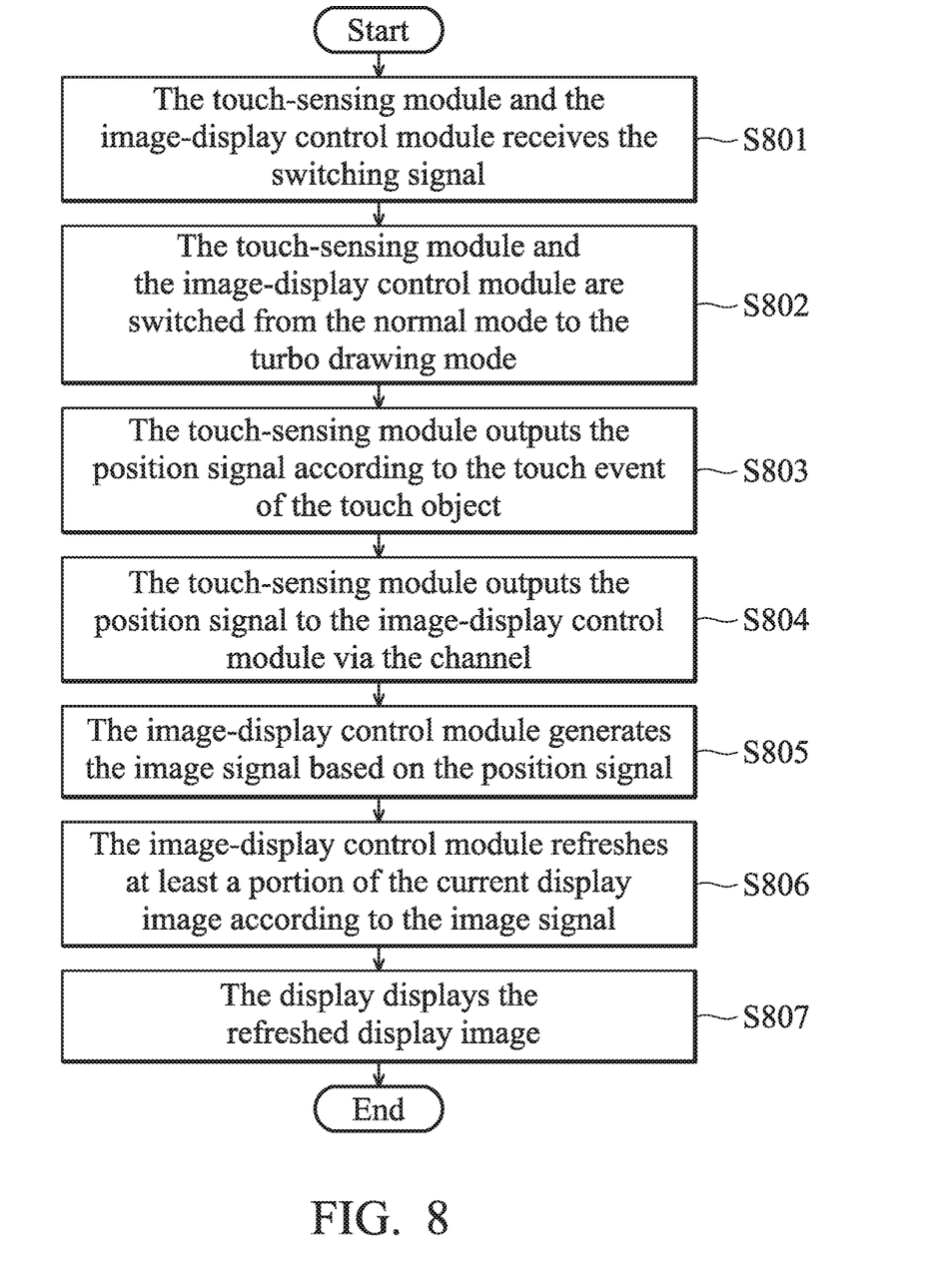
FIG. 8 is a flowchart of the method for generating displayed image in accordance with another embodiment of the present invention.

FIG. 8 is a flowchart showing the method for generating a displayed image in accordance with another embodiment of the present invention. In step S801, the user triggers a triggering event (e.g., pulling out the stylus, pressing the icon on the user interface, or pressing the physical key) to enable the touch-sensing module 310 and the image-display control module 320 to receive the switching signal. In step S802, the touch-sensing module 310 and the image-display control module 320 are switched from the normal mode to the turbo drawing mode according to the switching signal. In step S803, the touch-sensing module 310 outputs the position signal according to the touch event of the touch object. In step S804, the touch-sensing module 310 outputs the position signal to the image-display control module 320 via the channel. In step S805, the image-display control module 320 generates the image signal based on the position signal. In step S806, the image-display control module 212 refreshes at least a part of the current displayed image according to the image signal. In step S807, the display 360 displays the refreshed displayed image.

As described above, according to the electronic device and the method for generating displayed image provided in the present invention, when the electronic device enters the turbo drawing mode, since the touch signal does not need to be processed step by step via the processor and the display card, the reaction speed can be greatly increased to provide a better user experience. In addition, since the processor and the display card do not execute any procedures, the processor and the display card can be disabled or the power status can be changed in the turbo drawing mode. When components other than the touch-sensing module, the image-display control module, and the display are disabled, power savings approach 50%, helping to increase battery life.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. An electronic device, comprising:
    a touch-sensing circuit, configured to sense a touch event corresponding to at least one touch object, and outputting a position signal based on the touch event;
    an image-display control circuit, connected with the touch-sensing circuit through a channel, configured to receive the position signal via the channel from the touch-sensing circuit, and update at least a portion of a current displayed image according to the position signal;
    a display, configured to display an refreshed displayed image; and
    a processor, connected between the touch-sensing circuit and the image-display control circuit, configured to receive the position signal from the touch-sensing circuit according to a wake-up signal, and control the touch-sensing circuit to stop outputting the position signal to the image-display control circuit.

2. The electronic device as claimed in claim 1, further comprising:
    a storage unit, connected to with the image-display control circuit, configured to store at least one first user interface;
    wherein the image-display control circuit further loads the first user interface from the storage unit, and displays the refreshed displayed image through the first user interface.

3. The electronic device as claimed in claim 2, wherein the image-display control circuit further stores the refreshed displayed image in the storage unit.

4. The electronic device as claimed in claim 3, wherein the image-display circuit further sends the refreshed displayed image stored in the storage unit back to the processor according to the wake-up signal.

5. The electronic device as claimed in claim 3, wherein the processor further enables the display to display the refreshed displayed image through a second user interface according to the position signal.

6. The electronic device as claimed in claim 5, wherein the first user interface corresponds to a simple display mode, and the second user interface corresponds to a normal display mode.

7. The electronic device as claimed in claim 1, wherein the touch-sensing circuit and the image-display control circuit are integrated into the same chip.

8. A method for generating displayed image, adapted to an electronic device, comprising:
   sensing, by a touch-sensing circuit, a touch event corresponding to at least one touch object;
   outputting, by the touch-sensing circuit, a position signal based on the touch event;
   receiving, by an image-display control circuit, the position signal via a channel from the touch-sensing circuit;
   updating, by the image-display control circuit, at least a portion of a current displayed image according to the position signal;
   displaying, by a display, a refreshed displayed image;
   receiving, by a processor, the position signal from the touch-sensing circuit according to a wake-up signal; and
   controlling, by the processor, the touch-sensing circuit to stop outputting the position signal to the image-display control circuit;
   wherein the processor is connected between the touch-sensing circuit and the image-display control circuit.

9. The method as claimed 9, further comprising:
   loading, by the image-display circuit, a first user interface from a storage unit; and
   displaying, by the display, the refreshed displayed image through the first user interface.

10. The method as claimed 9, further comprising:
    storing, by the image-display circuit, the refreshed displayed image in the storage unit.

11. The method as claimed 10, further comprising:
    sending, by the image-display circuit, the refreshed displayed image stored in the storage unit back to the processor according to the wake-up signal.

12. The method as claimed 10, further comprising:
    enabling, la the processor, the display to display the refreshed displayed image through a second user interface according to the position signal.

13. The method as claimed 12, wherein the first user interface corresponds to a simple display mode, and the second user interface corresponds to a normal display mode.

14. The method as claimed 8, wherein the touch-sensing circuit and the image-display control circuit are integrated into the same chip.

* * * * *